US008681153B2

(12) United States Patent
Houllier et al.

(10) Patent No.: US 8,681,153 B2
(45) Date of Patent: Mar. 25, 2014

(54) MAP DISPLAY METHOD USED TO ENHANCE THE DISPLAY OF A BUILDING BY SHOWING SEVERAL LEVELS OF THIS BUILDING

(75) Inventors: Jean-Roch Houllier, Velizy (FR); Alain Brethereau, Velizy (FR); Béatrix De Mathan, Velizy (FR)

(73) Assignee: Alcatel Lucent, Paris (FR)

( * ) Notice: Subject to any disclaimer, the term of this patent is extended or adjusted under 35 U.S.C. 154(b) by 307 days.

(21) Appl. No.: 12/591,822

(22) Filed: Dec. 2, 2009

(65) Prior Publication Data

US 2010/0182317 A1     Jul. 22, 2010

(30) Foreign Application Priority Data

Jan. 20, 2009 (FR) ...................................... 09 50328

(51) Int. Cl.
    *G06T 17/00*         (2006.01)
(52) U.S. Cl.
    CPC ....................................... *G06T 17/00* (2013.01)
    USPC ................................. 345/428; 700/98; 703/1
(58) Field of Classification Search
    USPC .......................................................... 345/428
    See application file for complete search history.

(56) References Cited

U.S. PATENT DOCUMENTS

| | | | | |
|---|---|---|---|---|
| 5,448,696 | A | * | 9/1995 | Shimada et al. ............... 715/853 |
| 2002/0122038 | A1 | * | 9/2002 | Cowperthwaite .............. 345/428 |
| 2005/0162447 | A1 | * | 7/2005 | Tigges ........................... 345/661 |
| 2008/0177510 | A1 | * | 7/2008 | Jin et al. ............................ 703/1 |

OTHER PUBLICATIONS

Thomas Alan Keahey. 1998, "Nonlinear Magnification", Ph.D. Dissertation, Indiana University, Indianapolis, IN, USA.*
Carpendale M S T et al.: "A framework for unifying presentation space" UIST 01. Proceedings of the 14th Annual ACM Symposium on User Interface Software and Technology. Orlando, Fl. Nov. 11-14, 2001. New York, NY, Nov. 11, 2001, pp. 61-70.

(Continued)

*Primary Examiner* — James A Thompson
*Assistant Examiner* — Fikru Gennene
(74) *Attorney, Agent, or Firm* — Harness, Dickey & Pierce

(57) ABSTRACT

This method is used to enhance the display of a building (SC) showing several levels (T, F1, F2, F3) of this building, without hiding a portion of the map. It consists of:
    displaying (SPA6') a first level (T) of this building in the position of this building in the original image, with an enlargement ratio of 100%,
    displaying (SPP6a') the other levels (F1, F2, F3) of this building, juxtaposing them with the first level (T), with an enlargement ratio of 100%;
    and displaying (SPP6b'), in juxtaposition with the display (SPP6a') of the different levels (F1, F2, F3) of this building, a surface (SPP6b') representing a so-called peripheral portion (SPP6) located, in the original image, on the periphery of this building, this peripheral portion (SPP6) being displayed (SPP6') applying:
       to all elements of this peripheral portion (SPP6), enlargement ratios greater than or equal to a predetermined minimum value,
       and at least to some elements, respective enlargement ratios with values lower than 100%, chosen such that the combination of the display surface (SPP6b') of the peripheral portion and the display surface (SPP6a') of all the levels (T, F1, F2, F3) occupies, in the new image of the map, a surface (SPA6'+SPP6') equal to that of the combination of the display surface (SPA6) of the building (SC) and the display surface (SPP6) of the peripheral portion in the original image of the map.

5 Claims, 12 Drawing Sheets

(56) References Cited

OTHER PUBLICATIONS

Leung Y K et al. "A review and taxonomy of distortion-oriented presentation techniques" ACM Transactions on Computer-Human Interaction, New York, US, vol. 1, No. 2, Jun. 1, 1994 pp. 126-160.

Keahey T A et al.: "Techniques for non-linear magnification transformations" Information Visualization, 1996, Proceedings IEEE Symposium on San Francisco, CA, USA, Oct. 28-29, 1996, Los Alamitos, CA, USA. IEEE Comput. Soc, US, Oct. 28, 1996 pp. 38-45.

Hongzhi Song et al.: "LensList: Browsing and Navigating Long Linear Information Structures" Human Interface and the Management of Information. Methods, Techniques and Tools in Information Design; Lecture Notes in Computer Science; Springer, Heidelberg, Berlin. vol. 4557, Jul. 22, 2007, pp. 535-543.

Keahey: "Nonlinear Magnification" PhD thesis submitted to the faculty of the Indiana University Department of Computer of Science; Dec. 1997.

* cited by examiner

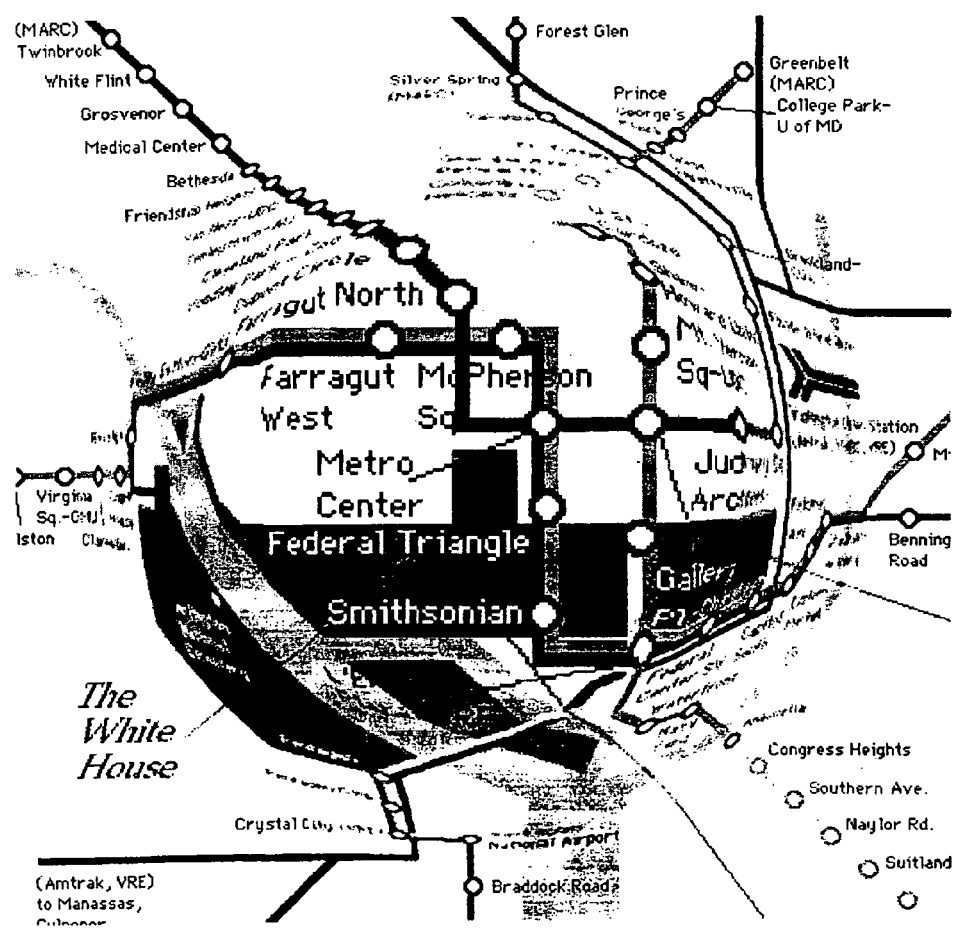

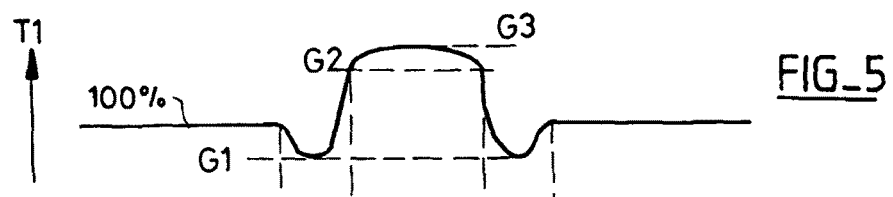
FIG_5
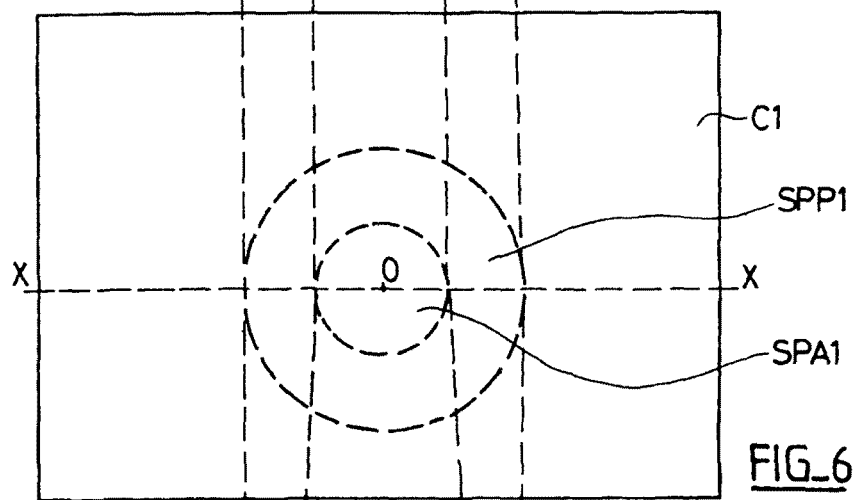
FIG_6
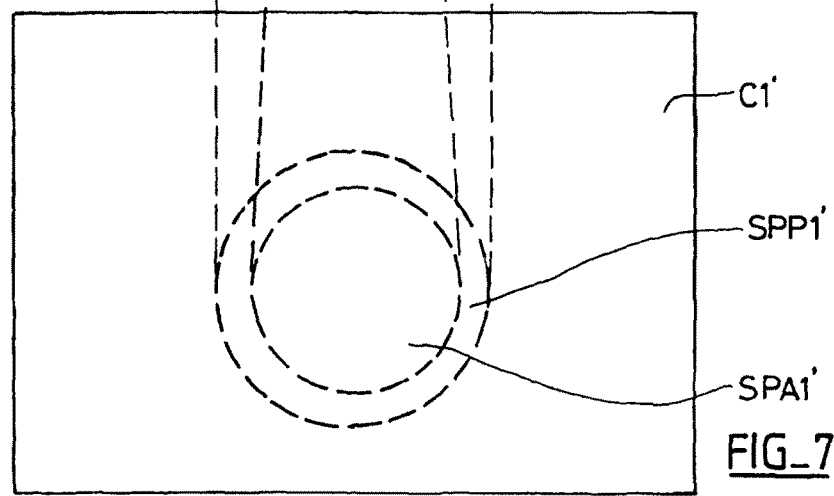
FIG_7

FIG_8
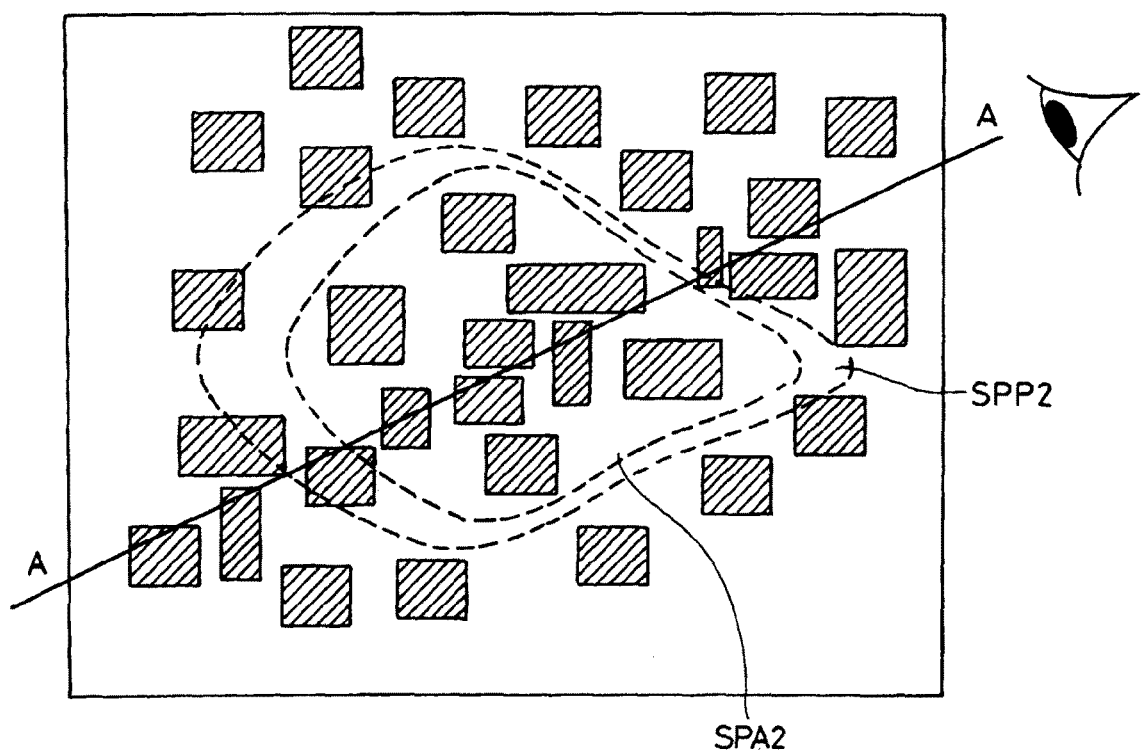

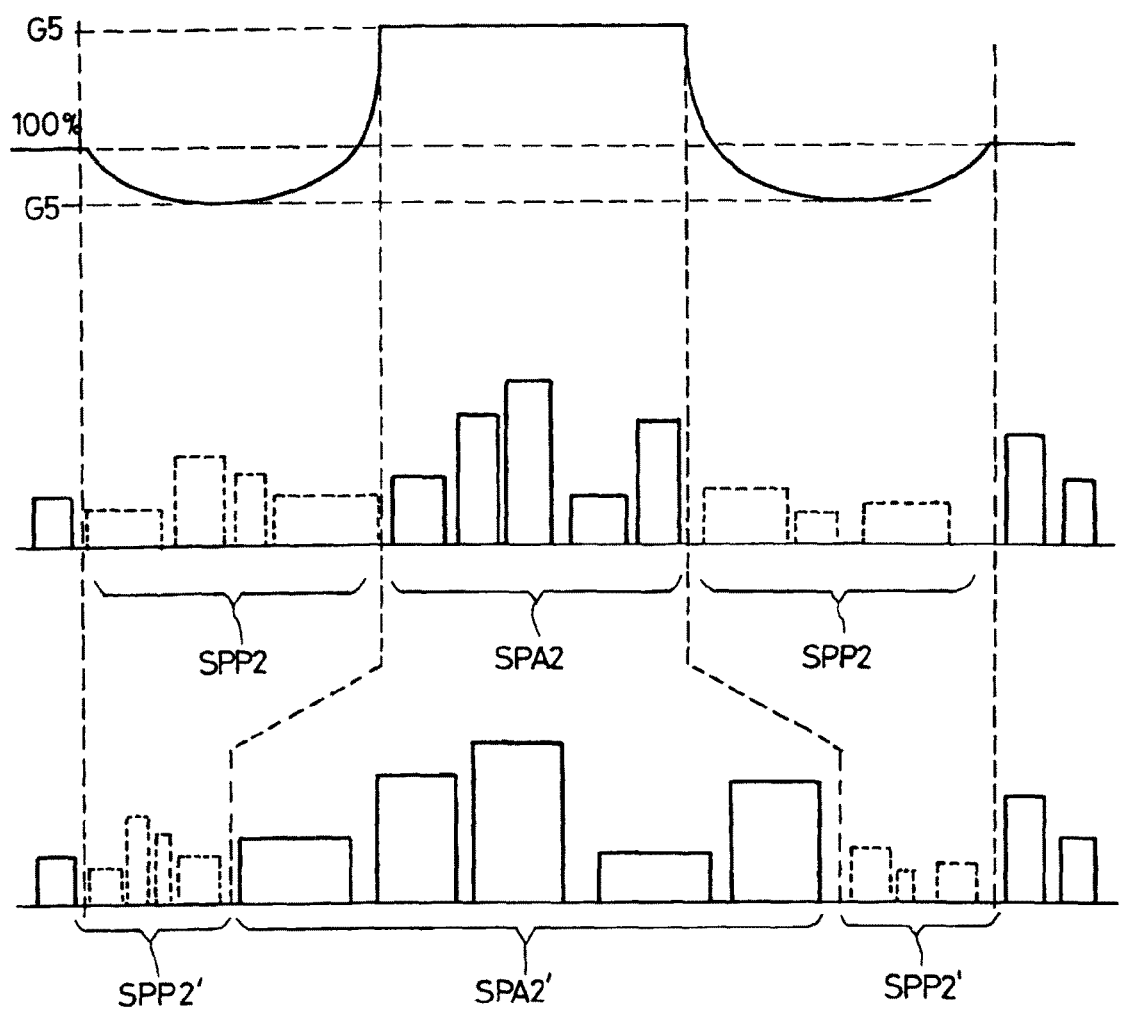
FIG_9

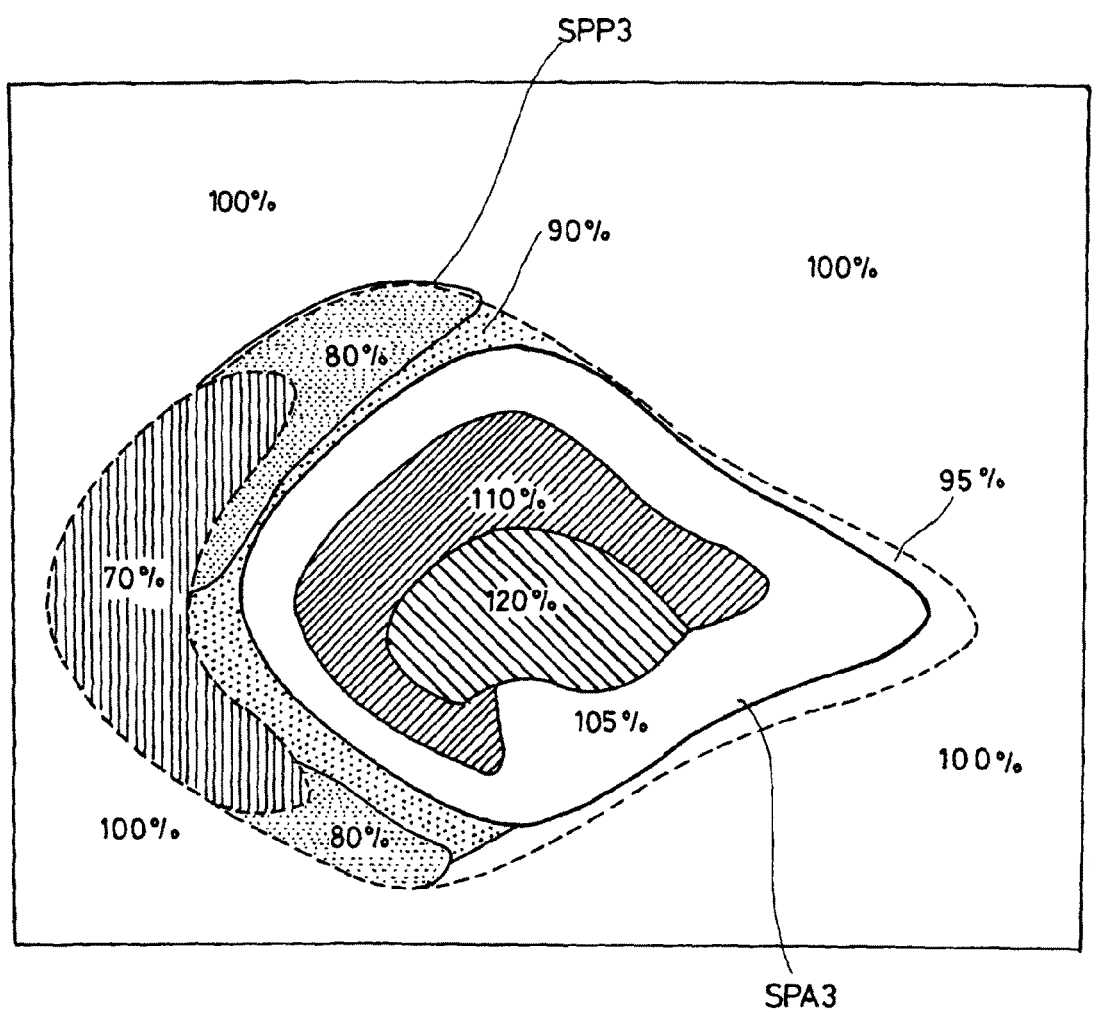
FIG_10

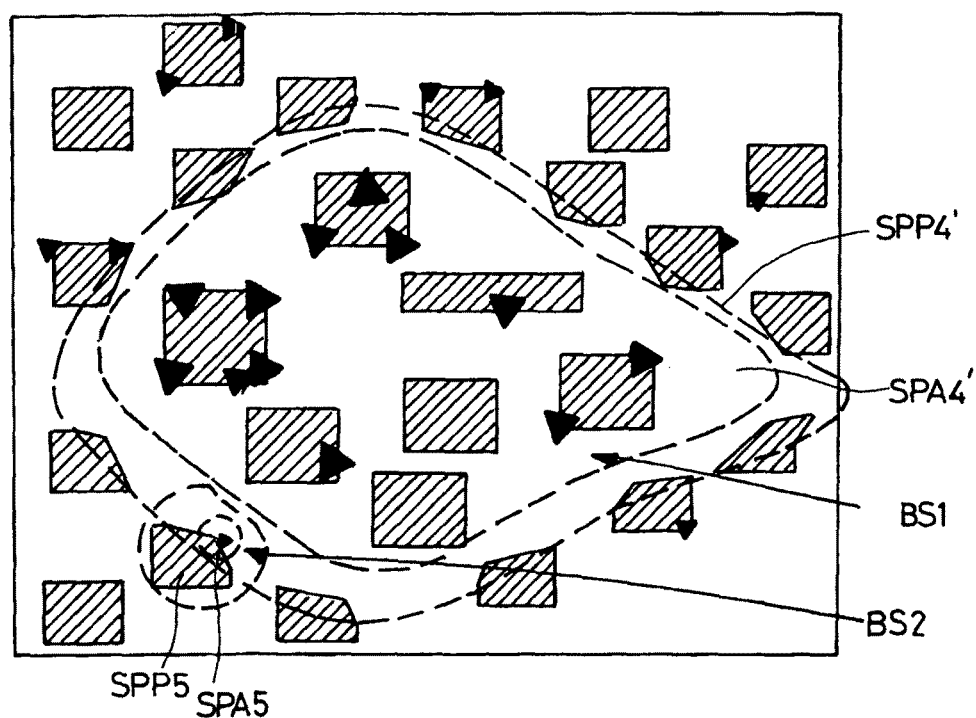
FIG_11
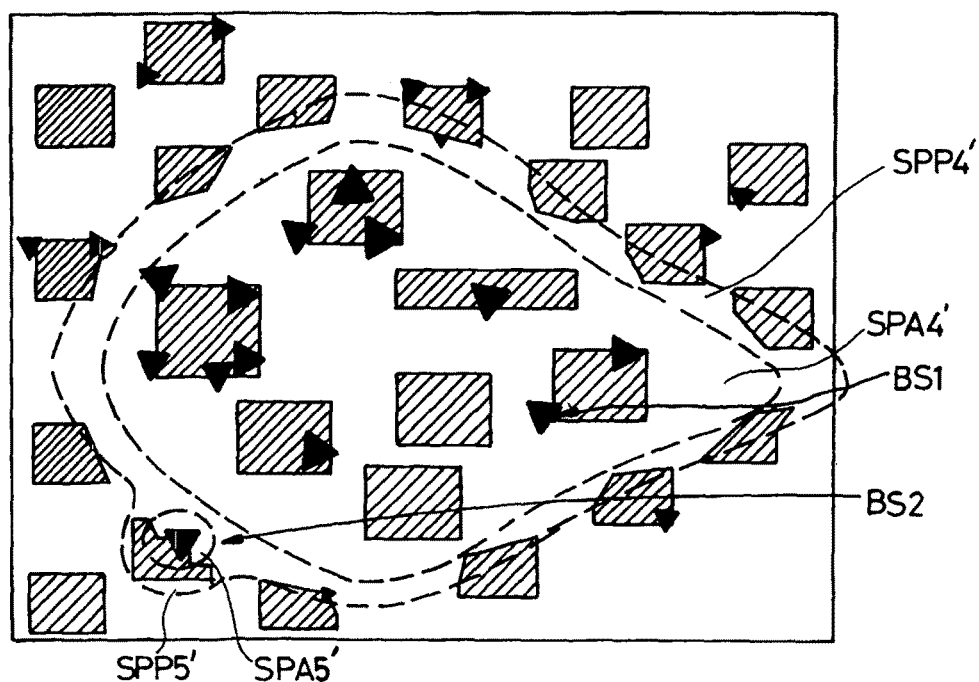
FIG12

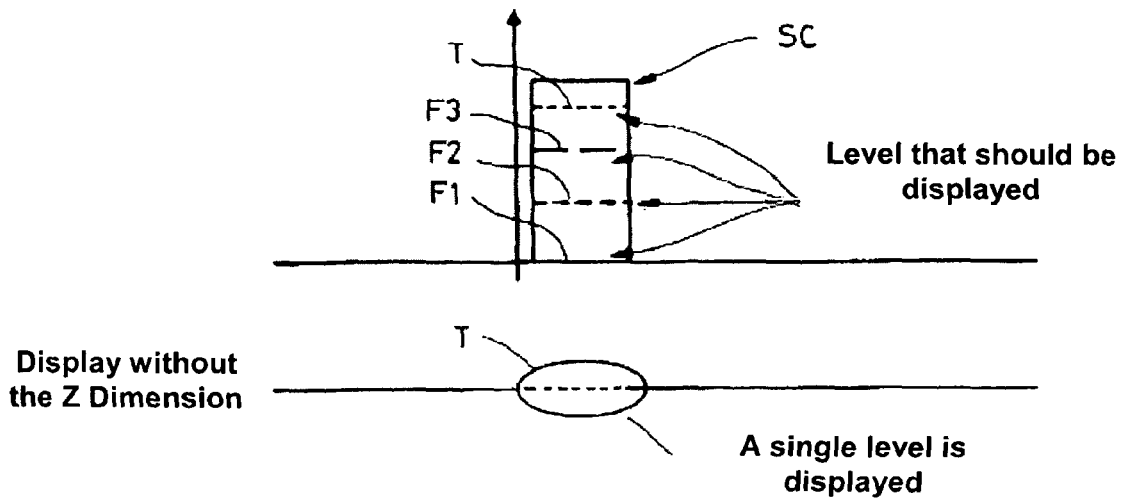
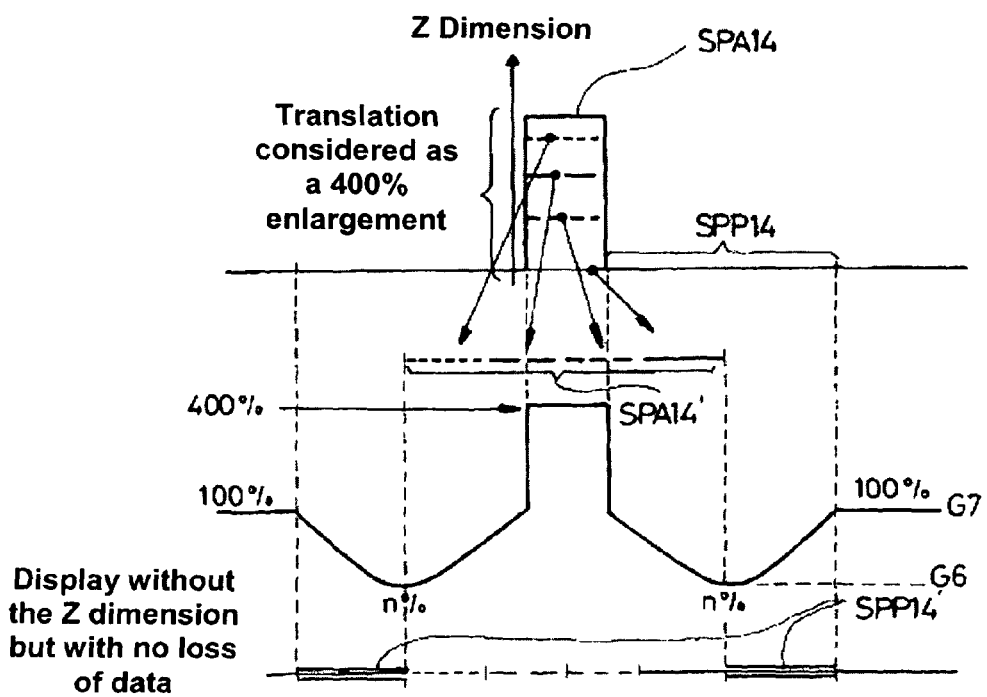

FIG_15
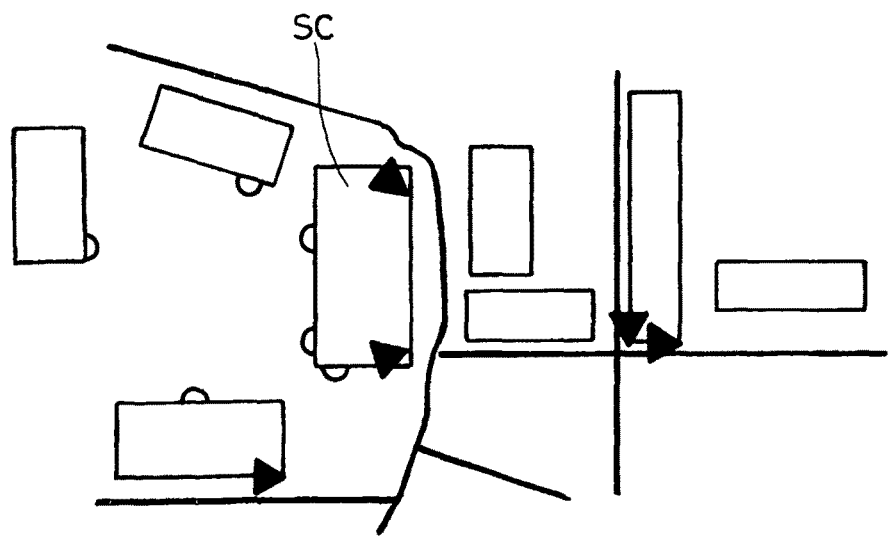
FIG_16
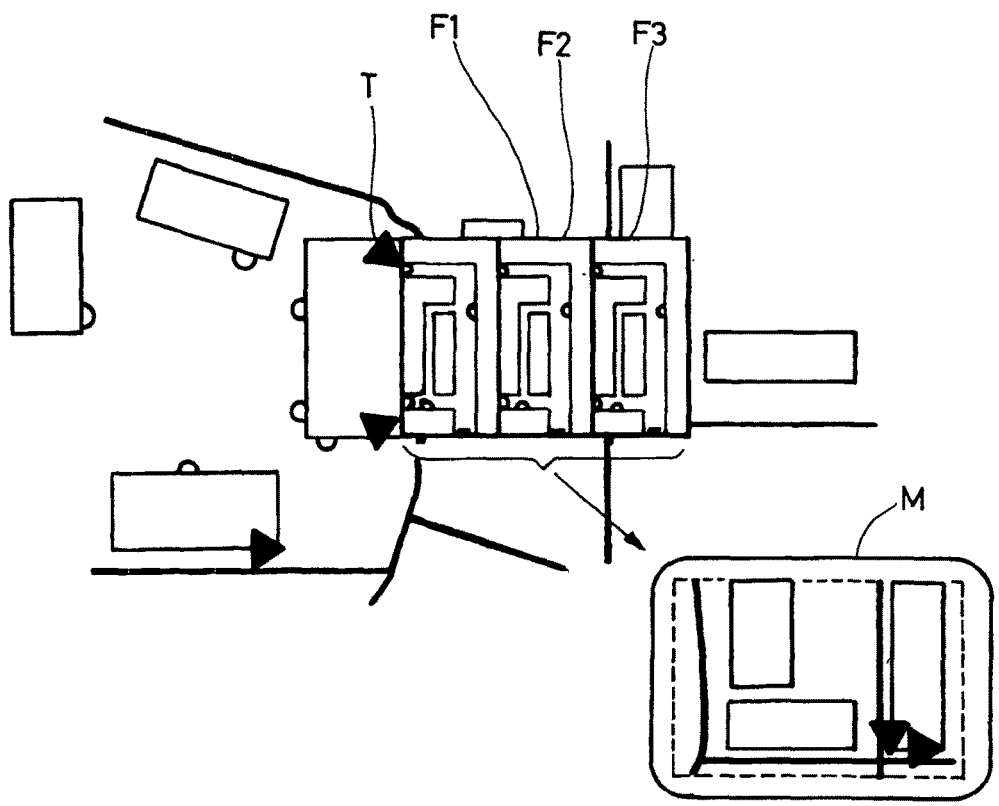

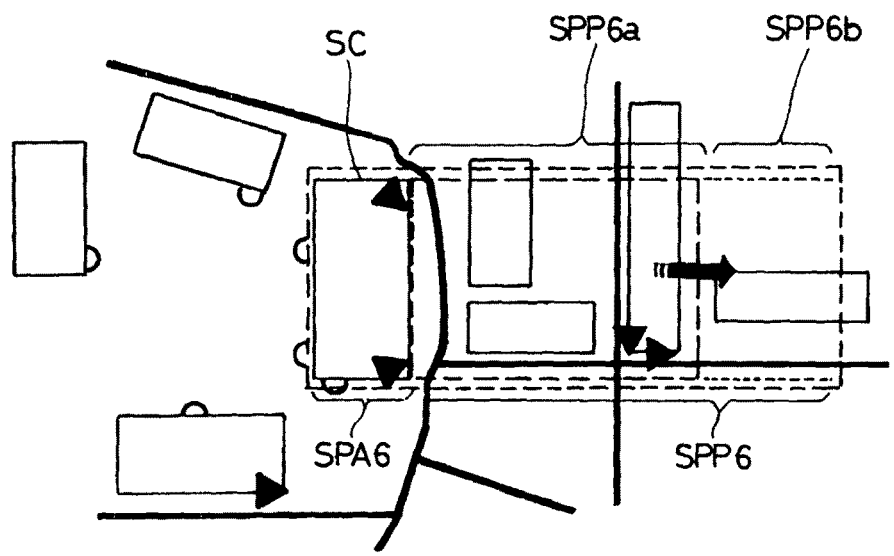
FIG_17
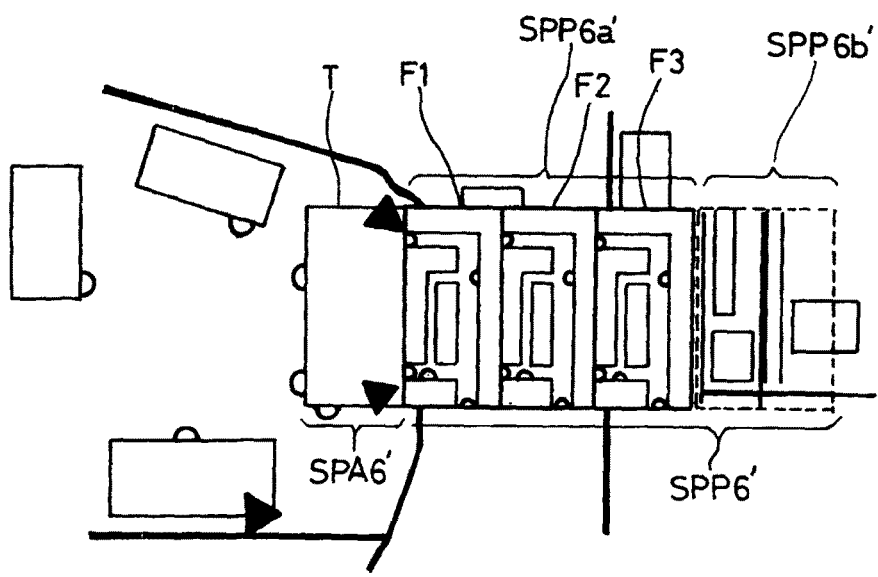
FIG_18

FIG_19
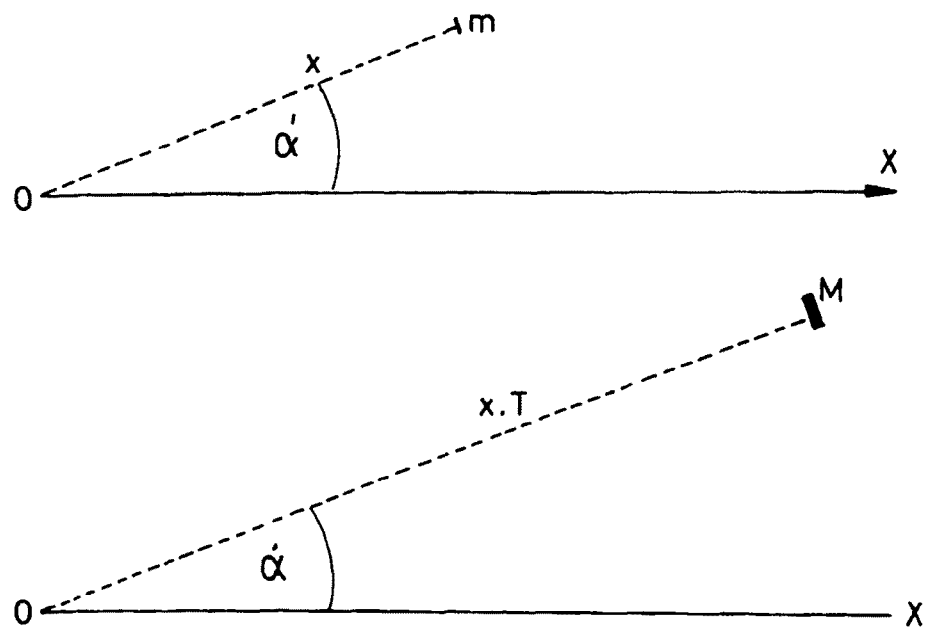
FIG_20
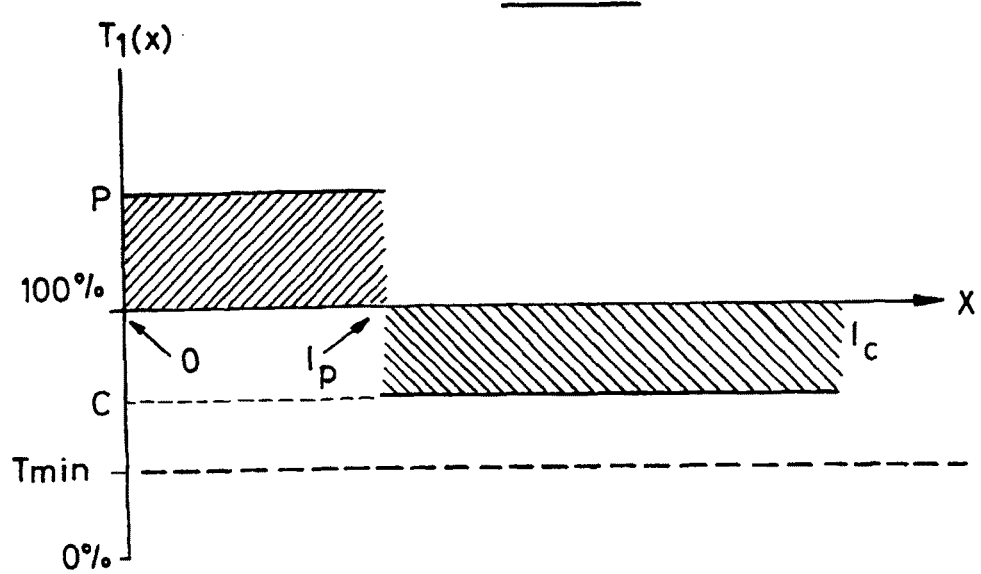

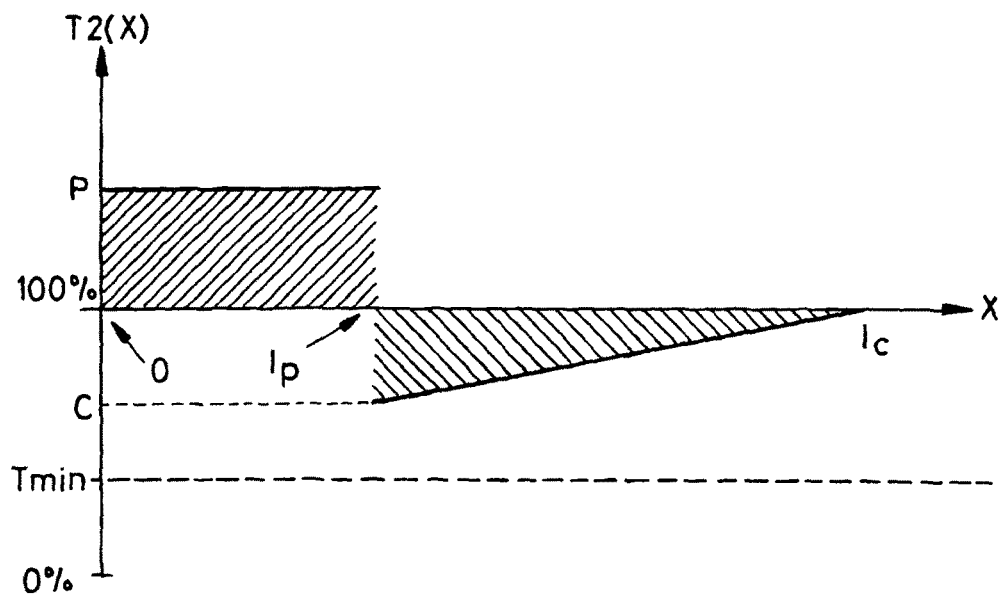
FIG_21
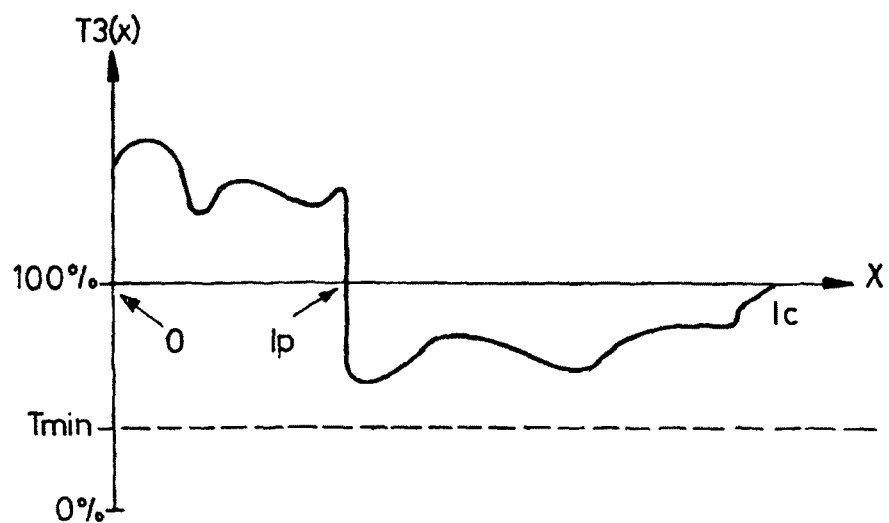
FIG_22

MAP DISPLAY METHOD USED TO ENHANCE THE DISPLAY OF A BUILDING BY SHOWING SEVERAL LEVELS OF THIS BUILDING

BACKGROUND OF THE INVENTION

1. Field of the Invention

The invention concerns a map display method which can be used in a geographic information system (GIS), or similar system, for example a telecommunication network optimization graphical system. A GIS is a computer tool used to organize and present spatially referenced alphanumerical data, as well as to produce drawings and maps.

2. Related Art

The role of a geographic information system is to propose a more or less realistic representation based on graphic primitives such as points, vectors (arcs), polygons or grids (also known as rasters). Associated with these primitives are attribute information such as the nature of the primitive (road, railway, forest, etc.) or any other contextual information (number of inhabitants, type or surface area of a commune for example).

A geographic information system is used to handle databases for flat or three-dimensional geographic data. A geographic table consists of a traditional table (comprising tabular fields of the type string, number, Boolean, date), which is however enhanced with a specific "geographic object" field containing the value of a geo-positioned geographic object (in practice, it is a data structure comprising the type of object and the list of its X, Y and if applicable Z coordinates). Three main types of geographic objects are handled: points, polylines (pecked lines) or polygons.

The three types of objects handled each have their benefits for modeling reality and representing real objects: a point can represent a tree, an inhabitant, a site; a polyline can represent a circulation path (sewer, street, road, motorway, railway, etc.) or any kind of transmission line (high-voltage cable, pipeline). Polygons, meanwhile, can be used to mark specific regions and zones (boundaries of administrative communes, park, suburb, business park, etc.). A geographic information system is therefore used to represent the existing geographic infrastructures and environment: communes, streets, départements, regions, or even mountain ranges (in the form of datum lines).

Specific analysis features also allow classifications to be produced on a table, and objects to be automatically assigned a specific graphic display format depending on the classification values. The data associated with the objects present in the tables displayed can be read when required, by clicking on the object which appears on the map.

There are two possible representation methods:
vectorial (vector format): objects are represented by points, lines, polygons or polygons with holes;
bitmap (raster format): this is a digitized image, drawing or photo displayed in the GIS as an image.

A system of geographic coordinates (spherical or projective) is used to reference the objects in space and position all of the objects in relation to the others. The objects are generally arranged in layers, each layer combining all homogeneous objects (building, rivers, road system, parcels, etc.).

A geographic information system is also used to represent the infrastructure data specific to a given sector. For example, a telecommunications operator may show its sites and its fiber optic links, or show mobile telephony base stations, with their coverage areas. Displaying this information in the form of a map allows the operator to understand more easily the state of the network, and therefore to manage the network to optimize the use of resources and the quality of the service.

A geographic information system offers the user a whole range of display management functions: the zoom and horizontal scroll functions are traditionally present on all geographic information systems. It is known to produce a zoom function which replaces the current image of a map with another image with the same surface area but showing a smaller (to see in greater detail) or larger (to see a larger region) land surface, depending on the choice of the user. This is the equivalent of changing the scale of the whole map displayed.

It is also known to carry out a local zoom (also known as a magnifying function) which enlarges a portion of the map displayed by displaying this portion, with a constant enlargement, above the initial image of the map, centering it over the portion to be enlarged. This method has the disadvantage of hiding a portion of the initial image of the map, the hidden surface being larger than the surface occupied by the portion to be enlarged in the initial image. For example, if the portion to be enlarged is circular and if the enlargement is +100% (on both the x and y axes), a circular image is embedded into the initial image with a radius twice that of the portion to be enlarged. As a result, the hidden surface is four times larger than the surface of the portion to be enlarged. There is therefore, around the portion which is being zoomed, a crown which is totally invisible and with a surface three times larger than the initial surface of the portion to be enlarged. This hiding of the peripheral zone can be very problematic. Furthermore, the sudden change of scale at the boundary of the enlarged portion creates a discontinuity which is highly prejudicial to the intelligibility of the objects shown.

It is known to resolve this hiding problem and this discontinuity problem through a nonlinear display method.

The thesis of T. Alan Keahey, Nonlinear Magnification, PhD thesis, Department of Computer Science, Indiana University, December 1997, describes different nonlinear display methods used to locally carry out a zoom enlarging a portion of a map, without hiding anything on the periphery of this portion, thanks to the fact that a zone located at the periphery of this portion to be enlarged is reduced, such that it compensates for the increased display surface of the portion to be enlarged.

This document also shows that such a display method can be controlled dynamically by geographic data, for example to enlarge a portion of a map showing road traffic, in order to highlight a road on which traffic measures have revealed the formation of a traffic jam, or to enlarge several portions of the same map showing air traffic, in order to highlight portions where air traffic is particularly heavy.

FIG. 1 shows a method, known by this thesis, for enlarging a circular portion in a map represented in diagram form by a checkerboard. An enlargement (enlargement value greater than 100%), roughly constant, is applied to the center of the portion to be enlarged, while a reduction (enlargement value lower than 100%), highly nonlinear, is applied to the periphery of the portion to be enlarged. More precisely, this known method involves displaying the so-called peripheral portion, located on the periphery of the portion to be enlarged, by applying respective enlargement ratios with values lower than 100% to certain elements of that peripheral portion, and such that the combination of the display surface of the peripheral portion and the display surface of the portion to be enlarged occupies, in the new image of the map, a surface equal to that of the combination of the display surface of the portion to be enlarged and the display surface of the peripheral portion in the original image of the map.

FIG. 2 shows a perspective view of a grid in which the vertical coordinate of each point represents an enlargement value used for the example of FIG. 1. A peak can be seen with a flat circular summit, and with a base surrounded by a circular valley. The vertical coordinate of the flat part surrounding this valley represents the initial enlargement (100%) of the map. The vertical coordinate of the flat summit represents the enlargement applied to the enlarged portion of the map. The valley corresponds to enlargement values lower than 100%, in other words achieving a reduction. The vertical coordinate of the bottom of the valley represents the minimum enlargement value, which corresponds to the highest reduction. On the external flank of the valley, the enlargement passes continuously from the initial value (100%) to the minimum value. On the internal flank, the enlargement passes progressively from the minimum value to the initial value (100%) constituting the base of the peak.

FIG. 3 shows a perspective view of the same grid, superimposed with the map represented in diagram form by a checkerboard.

FIG. 4 shows an actual map, from the Washington subway network, on which such a known method has been applied to enlarge a circular portion located at the center of the map. The objects located at the periphery of the enlarged portion are reduced. This figure shows that there is no hidden zone, and no discontinuity of the objects represented. A slight blur is applied to the peripheral zone to mark the boundary between the enlarged portion and the non-enlarged portion of the map. It should be noted that, despite the absence of hiding, there is a loss of information in the peripheral zone since the screen and the eye do not have an infinite resolution ability: the subway stations located in the peripheral zone are visible, however their names are not legible due to the distortion and the reduction in the size of the characters.

The document HONGZHI SONG ET AL: "LensList: Browsing and Navigating Long Linear Information Structures HUMAN INTERFACE AND THE MANAGEMENT OF INFORMATION. METHODS, TECHNIQUES AND TOOLS IN INFORMATION DESIGN; [LECTURE NOTES IN COMPUTER SCIENCE], SPRINGER BERLIN HEIDELBERG, BERLIN, HEIDELBERG, vol. 4557, 22 Jul. 2007 (2007-07-22), pages 535-543, XP019064238 ISBN: 978-3-540-73344-7* FIGS. 1-3, pages 537-539* describes a method for displaying a list of words (constituting a menu for example), which provides a magnifying effect on a central portion of this list, without hiding the upper portion or the lower portion of this list, thus guaranteeing the legibility of all the words of the list. It involves enlarging the font of the words in the central portion of the list and reducing the font of the words in the upper portion and in the lower portion. The size of the font increases linearly from the top of the list displayed towards the center of the list displayed, then decreases linearly from the center towards the end of the list displayed. The maximum size and the minimum size are chosen by the user.

In the case of the display of a geography map, one disadvantage of the known methods is that, even in the enlarged portion, the representation of a building only shows the surface occupied by this building; in other words, only the roof can be seen. It can be envisaged to enhance the display of a building by showing all levels, juxtaposing the respective plans of all of these levels, but then the surface displaying all of these plans hides a portion of the map.

SUMMARY OF THE INVENTION

One goal of the invention is to propose a map display method used to enhance the display of a building on a map, showing all the levels of this building, without hiding another portion of this map, and guaranteeing the legibility of all the important objects located at the periphery of the surface displaying the different levels of this building.

The aim of the invention is a map display method allowing the display of a building on a map to be enhanced, without hiding another portion of this map, characterized in that it involves:

displaying a first level of this building in the position of this building in the original image, with an enlargement ratio of 100%, displaying the other levels of this building, juxtaposing them with the first level, with an enlargement ratio of 100%;

and displaying, in juxtaposition with the display of the different levels of this building, a surface representing a so-called peripheral portion located, in the original image, on the periphery of said building, this peripheral portion being displayed by applying:

to all elements of this peripheral portion, enlargement ratios greater than or equal to a pre-determined minimum value, and at least to some elements, respective enlargement ratios with values lower than 100%, chosen such that the combination of the display surface of the peripheral portion and the display surface of all the levels occupies, in the new image of the map, a surface equal to that of the combination of the display surface of the building and the display surface of the peripheral portion in the original image of the map;

The method characterized in this way avoids hiding important objects located on the periphery of the building displayed, since it involves showing all of this periphery with an enlargement ratio lower than 100%. This ratio is chosen as lower than 100% to save surface area and reuse the surface area saved to display the different levels, but a minimum enlargement ratio value is chosen so that a user can still read the objects considered to be important.

For example, if the map shows a telecommunication network with small symbols to indicate alarms, a priority stage in the creation of the new image involves choosing the minimum value of the enlargement ratio which will be applied in the peripheral zone of the building to be displayed, such that a user can still easily read the alarm symbols in the peripheral zone, since it would be very damaging for an alarm to pass unnoticed due to the reduction in enlargement size at the periphery of the building.

The invention also has the objective of providing a programmable device comprising storage means on which a program is saved, said program comprising instructions which, when run by a computer, carry out the stages of the method according to the invention.

The invention also has the objective of providing storage means on which a program is saved comprising instructions which, when run on a programmable device, carry out the stages of the method according to the invention.

BRIEF DESCRIPTION OF THE DRAWING(S)

The invention will be better understood and other characteristics will appear with the help of the description below and the accompanying figures:

FIG. 1, described previously, illustrates a method, known to the thesis mentioned above, for enlarging a circular portion in a map represented in diagram form by a checkerboard.

FIG. 2, described previously, shows a perspective view of a grid in which the vertical coordinate of each point represents a value of the enlargement ratio.

FIG. 3, described previously, shows a perspective view of the same grid, superimposed with a map represented by a checkerboard.

FIG. 4, described previously, shows an actual map, from the Washington subway network, on which such a known method has been applied to enlarge a circular portion located at the center of the map.

FIG. 5 shows the enlargement ratio graph in a first example of the implementation of a method used to enlarge a portion of a map without hiding a portion of this map.

FIG. 6 shows in diagram form the original image of a map, for this first example.

FIG. 7 shows in diagram form the locally enlarged image of this same map, for this first example.

FIG. 8 shows in diagram form the original image of a second map, to illustrate a second example of the implementation of this method used to enlarge a portion of a map without hiding a portion of this map.

FIG. 9 shows the enlargement ratio graph in this second example, and illustrates the visual effect obtained.

FIG. 10 shows in diagram form the locally enlarged image of this second map, for this second example, indicating the values of the enlargement ratio, chosen for various zones of a portion to be enlarged and various zones of a peripheral portion.

FIG. 11 shows in diagram form the locally enlarged image of a third map, for a third example of the implementation of a method used to enlarge a portion of a map without hiding a portion of this map, where there is additional local enlargement controlled dynamically by an event.

FIG. 12 illustrates the visual effect obtained in this third example.

FIG. 13 shows a front view, in diagram form, of a building comprising several levels which are to be displayed simultaneously.

FIG. 14 illustrates the implementation of the method according to the invention to simultaneously represent the three levels and the roof of this building, without hiding the peripheral zone and without losing the legibility of the important details in this peripheral zone.

FIG. 15 shows in diagram form the original image of a fourth map, which represents in particular a building comprising several levels which are to be displayed simultaneously.

FIG. 16 shows in diagram form the image enlarged locally by a known method, for this fourth map.

FIG. 17 illustrates an example of the implementation of the method according to the invention, used to display the representation of the different levels of this building without hiding a portion of the map and without losing the legibility of the important details in the peripheral zone.

FIG. 18 shows in diagram form the image displayed by this example of implementation of the method according to the invention.

FIG. 19 shows an example of an enlargement method for the implementation of the method according to the invention.

FIG. 20 shows the graph of a first example of the enlargement function for the implementation of the method according to the invention.

FIG. 21 shows the graph of a second example of the enlargement function for the implementation of the method according to the invention.

FIG. 22 shows the graph of a third example of the enlargement function for the implementation of the method according to the invention.

DETAILED DESCRIPTION

Figure 1:
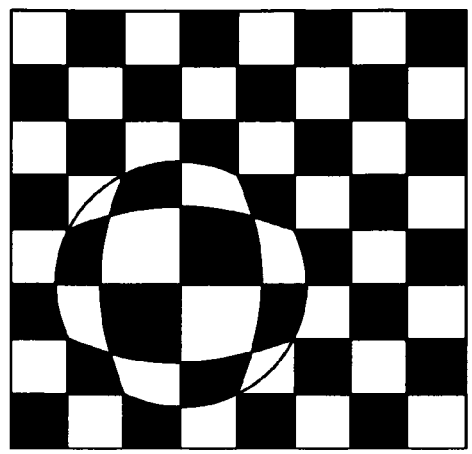
Figure 2:
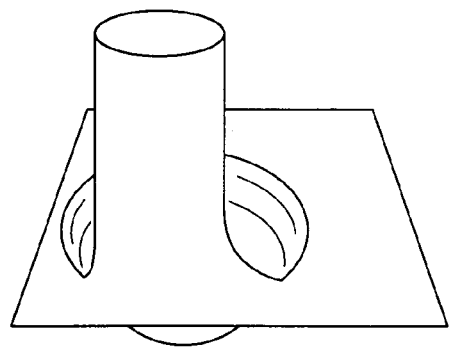
Figure 3:
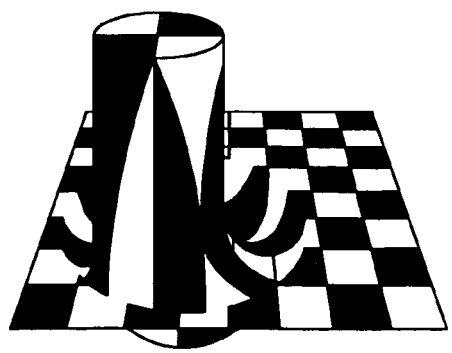

FIGS. 5 to 7 show how to enlarge a portion of a map without hiding a portion of this map: FIG. 6 shows in diagram form the original image C1 of a map, on a computer screen. A user wishes to locally enlarge this image, by enlarging a portion, said to be the portion to be enlarged, which occupies a surface SPA1 in the original image C1.

FIG. 5 shows the graph of the enlargement ratio T1 in different portions of the original image C1. The image elements concerned for this graph are located on a straight line XX passing through the center O of the surface SPA1 of the portion to be enlarged. In this example, the graph would be the same for any other straight line passing through the center O.

FIG. 7 shows in diagram form the image C1' obtained by locally enlarging the image C1. The portion to be enlarged is enlarged by displaying it, in the new image C1', over a surface SPA1' larger than the surface SPA1. The elements of this portion to be enlarged are enlarged with respective enlargement ratios which are all greater than a value G2, greater than 100%, with a ratio of 100% corresponding to the original display. The ratio passes via a maximum G3 to the center of the portion to be enlarged.

In order to allow the display of this surface SPA1' without hiding another portion of the image, a so-called peripheral zone, SPP1, located on the periphery of the surface SPA1 of the portion to be enlarged in the original image C1 is displayed over a surface SPP1', in the new image C1', such that the combination of the surface SPP1' and the surface SPA1' occupies, in the new image C1', a surface equal to that of the combination of the surface SPA1 and the surface SPP1 in the original image C1.

To avoid any discontinuity in the visual effect, the enlargement ratio along the line XX varies continuously from a ratio of 100%, applied to the elements of the peripheral portion SPP1 which are furthest from the portion to be enlarged SPA1, until the ratio G2 applied to the elements of the portion to be enlarged SPA1, which are at the boundary with the peripheral portion SPP1, passing via values lower than 100%, in particular a minimum value G1.

This minimum value G1 is chosen so that a user can still read certain important items represented on the map, for example symbols indicating alarms; then all of the other values of the enlargement ratio to be applied respectively to the elements of the peripheral zone SPP1 are determined such that:

the combination of the surface SPP1' and the surface SPA1' occupies, in the new image C1', a surface equal to that of the combination of the surface SPA1 and the surface SPP1 in the original image C1;

and that the ratio varies continuously from the ratio of 100% to a ratio G2 applied to an element of the portion to be enlarged SPA1 which is at the boundary with the peripheral portion SPP1, passing via a single extremum which is said minimum value G1.

Either the user chooses the respective sizes of the surfaces SPP1 and SPA1, and then the choice of the minimum value G1 imposes the maximum value G3 for the enlargement ratio in the portion to be enlarged.

Or the user chooses the maximum value G3 for the portion to be enlarged, and then the choice of the value G1 imposes the maximum sizes of the surfaces SPP1 and SPA1.

FIG. 8 shows in diagram form the original image of a second map, for a second example of the implementation of a method used to enlarge a portion of a map without hiding a portion of this map.

On this map, buildings are represented, seen from above, by rectangles. A portion to be enlarged which occupies a surface SPA2, and a peripheral portion which occupies a surface SPP2 are considered in the original image. These two portions have a compact shape but which is not circular, to cover the zone of most interest for a user. This user has selected the portion to be enlarged, using a pointing device such as a mouse.

FIG. 9 shows the enlargement ratio graph in this second example, and illustrates the visual effect obtained. The upper portion of the figure represents the enlargement ratio graph for the elements, from the original image, located along a straight line AA passing approximately via the center of the surface SPA2 of the portion to be enlarged. The enlargement ratio along the line AA varies continuously from a ratio of 100%, applied to the elements located outside the portion to be enlarged SPA2 and outside the peripheral portion SPP2, up to a maximum value G5 applied uniformly to all elements of the portion to be enlarged SPA2, passing via a minimum value G4 which is chosen so that a user can still read certain objects shown in the surface SPP2' which represents the peripheral portion SPP2, for example symbols indicating alarms. Then all of the other values of the enlargement ratio to be applied respectively to the elements of the peripheral zone SPP2 are determined such that:

the ratio varies continuously from the ratio of 100% up to the ratio G5 passing via a single extremum which is said minimum value G4;

and that the combination of the surface SPP2' representing the peripheral portion and the surface SPA2' representing the portion to be enlarged occupies, in the new image, a surface equal to that of the combination of the surface SPA2 and the surface SPP2 in the original image.

The center line represents a front view, in diagram form, of the buildings located in the surface SPA2 of the portion to be enlarged, and the buildings located in the surface SPP2 of the peripheral portion, of the original image. In these two surfaces, the buildings are visible with the same size since they are all displayed with the same enlargement ratio of 100%.

The lower line represents a front view, in diagram form, of the buildings located in the surface SPA2' of the portion to be enlarged, and the buildings located in the surface SPP2' of the peripheral portion, in the new image. In the surface SPP2' the buildings are displayed with a smaller size than in the surface SPA2', but it can be noted that all the buildings are visible, none are hidden due to the surface SPA2' being larger than SPA2.

FIG. 10 illustrates a variant of the implementation of a method used to enlarge a portion of a map without hiding a portion of this map. This variant involves breaking down a portion to be enlarged SPA3 into a plurality of zones with different enlargement ratios, 105%, 110%, 120%, and also breaking down a peripheral portion SPP3 into a plurality of zones with different enlargement ratios, 70%, 80%, 90%, 95%. The values of the enlargement ratio, respectively for the various zones, are chosen by a user based on the interest of each zone.

This minimum value (70%) in the peripheral portion SPP3 is chosen so that a user can still read certain objects shown on the map, for example symbols indicating alarms. After this minimum value is chosen, the other values are chosen such that the combination of the display surface SPP3 of the peripheral portion and the display surface SPA3 of the portion to be enlarged occupies, in the new image, a surface equal to that of the combination of the display surface of the portion to be enlarged and the display surface of the peripheral portion, in the original image of the map.

FIG. 11 shows in diagram form the locally enlarged image of a third map. It illustrates a third example of the implementation of a method used to enlarge a portion of a map without hiding a portion of this map. In this example, there is an additional local enlargement controlled dynamically by an event. This map represents buildings using rectangles, and the base stations of a mobile telephony network using triangles.

A first portion to be enlarged (not shown) is displayed over a surface SPA4' with an enlargement ratio greater than 100%. A first peripheral portion (not shown) is displayed over a surface SPP4'. The first portion to be enlarged has been limited by a user to cover a zone where there is a high density of base stations. The triangle representing the station BS1 is indicated on this figure by way of example. An alarm in a base station is indicated by a change of color or a flashing of the corresponding triangle.

The triangles which symbolize the base stations are displayed with a larger size in the enlarged portion SPA4' than in the non-enlarged portion. However, the triangles are displayed with a smaller size in the peripheral portion SPP4' than in the non-enlarged portion, since the enlargement ratio there is lower than 100% for most of the image elements. To improve the visibility of the alarms in the peripheral portion, it is planned to detect each "Alarm" event in said peripheral portion SPP4', and then automatically define:

a second portion to be enlarged SPA5, of a small size, and centered on the position of this event, the base station BS2 in this example;

and a second peripheral zone SPP5 surrounding this second portion to be enlarged SPA5, and where the enlargement ratio is reduced so as to avoid hiding a portion of the map. This second peripheral zone SPP5 is defined avoiding encroaching on the surface SPA4' which displays the first portion to be enlarged, so as not to cause a reduction in this portion which is of particular interest to the user.

FIG. 12 represents the new image obtained in this third example. This third implementation example involves:

displaying over a surface SPA5' the second portion to be enlarged SPA5, displaying the elements of this portion with respective enlargement ratios greater than 100%, preferably with the same ratio as for the first enlarged portion SPA4', so that the base station BS2 is then displayed with the same size as the base station BS1 which is in the first enlarged portion SPA4';

and displaying over a surface SPP5' the second peripheral portion SPP5, displaying the elements of this portion with respective enlargement ratios such that no portion of the map is hidden.

The surface SPP5' and the surface SPP4' have common elements. They are then connected so as to form a single surface SPP4'-SPP5' where the values of the enlargement ratio are lower than 100%, and are smoothed to avoid any discontinuities. The enlargement ratios are recalculated for all elements which make up the combination of the surfaces SPP5' and SPP4' according to the stages involving:

choosing the minimum value of the enlargement ratio to be applied to the elements of this surface SPP4'-SPP5', so that all the important elements of the map remain legible;

then determining all of the values of the enlargement ratio to be applied respectively to the elements of this surface SPP4'-SPP5', in such a way that these values are at least equal to the minimum value chosen in this way;

and determining all of the values of the enlargement ratio to be applied respectively to the elements of the first and the second portion to be enlarged, in such a way that the combination of the surface SPP4'-SPP5', the surface SPA4' and the surface SPA5' occupies in the new image a surface equal to that of the combination of the first portion to be enlarged, the second portion to be enlarged SPA5, the first peripheral portion and the second peripheral portion SPP5, in the original image of the map.

FIG. 13 shows a front view, in diagram form, of a building SC comprising several levels T, F1, F2, F3, which are to be displayed simultaneously. The lower portion of this figure shows this building on a map in diagram form, with no representation of the dimension Z. Only the highest level, in other words the roof T, is shown.

FIG. 14 illustrates the implementation of the method according to the invention to simultaneously represent the three levels and the roof of this building SC, without hiding the peripheral zone and without losing the legibility of the important details in this peripheral zone. The three levels are represented translating them so that they are juxtaposed on a horizontal plane, along a common axis. Along this axis, they are four times longer than the roof alone. Everything appears as if the image of the roof had been enlarged with a ratio of 400% along this axis. In this example, the surface SPA14' showing the four levels is centered on the position of the surface SPA14 showing the original building.

The middle portion of the figure represents the enlargement ratio applied. To avoid hiding a portion of the map, a peripheral zone SPP14, around the SPA zone to be enlarged SPA14 corresponding to the roof, is compressed with a variable enlargement ratio which always remains lower than the original enlargement ratio $G7=100\%$. It passes via a minimum $G6=n\%$, chosen so as to retain the legibility of the important details in this peripheral zone.

The lower portion of the figure shows in diagram form the representation obtained for this building: Four levels juxtaposed occupying a surface SPA14' and surrounded by the compressed peripheral zone occupying a surface SPP14'.

FIG. 15 shows in diagram form the original image of a fourth map, which represents in particular a building comprising several levels which are to be displayed simultaneously. This building may for example be a shopping mall with three levels of shops and a roof, in which base stations of a radiotelephony network are distributed. In the original image, this shopping mall is represented by a rectangle SC.

FIG. 16 shows in diagram form a locally enlarged image, from this fourth map, by a known method, to show the difference in relation to the display obtained according to the invention. The enlargement involves, in this example, simultaneously showing the three levels and the roof of this shopping mall while hiding a portion of the surrounding area. The roof is represented by a rectangle T which is identical to the rectangle SC in the original image. The three levels are represented respectively by three rectangles F1, F2, F3, of the same length and the same width as the rectangle T representing the roof of the building. The three rectangles F1, F2, F3 are juxtaposed, by their longest sides, and are affixed to one of the two longest sides of the rectangle T. On this figure, an inset M represents the elements of the map which are no longer visible since they are hidden by the display of the three levels F1, F2, F3, according to this known method. The method according to the invention is used to avoid this loss through hiding, and allows the legibility of the important details in the peripheral zone to be retained.

FIG. 17 illustrates a second example of the implementation of the method according to the invention, used to display the representation of the different levels of this same building without hiding a portion of the map, and retaining the legibility of the important details in the peripheral zone. It consists of:

Defining a so-called portion to be enlarged, SPA6, consisting of the rectangle SC representing the roof of the building to be enlarged ("enlarge" here involves projecting the three levels onto the same drawing, retaining the same enlargement ratio for each level, which takes up as much space as an enlargement of the rectangle SC with a ratio of 400%).

Defining a so-called peripheral portion, SPP6, which is a rectangle affixed to the rectangle SC, with a width equal to the length of the rectangle SC, and which consists of:
a portion SPP6a which is a rectangle with a surface three times greater than the surface of the rectangle SC,
and a portion SPP6b which is a rectangle with a length equal to the length of the rectangle SC, and with for example a width equal to 1.5 times the width of the rectangle SC.

This peripheral portion SPP6 constitutes the position to be reserved to display rectangles F1, F2, F3 representing the three levels, and to display a reduced view of the portion hidden by the rectangles F1, F2, F3, and by the display of the portion SPP6b itself in the new image.

FIG. 18 shows in diagram form the new image displayed by this second example of the implementation of the method according to the invention. In the position of the surface SPP6 which displayed the peripheral portion, there is a surface SPP6' which displays the three rectangles F1, F2, F3 representing the three levels, and which also displays, over a surface SPP6b', a reduced view of the portion of the map which is hidden by the rectangles F1, F2, F3, and by the portion SPP6b itself.

The peripheral portion SPP6 is displayed by applying:
to all elements of this peripheral portion SPP6 enlargement ratios greater than or equal to a pre-determined minimum value,
and at least to some elements respective enlargement ratios with values lower than 100%, chosen such that the combination of the display surface SPP6b' of the peripheral portion and the display surface SPP6a' of all the levels T, F1, F2, F3 occupies, in the new image of the map (FIG. 16), a surface SPA6'+SPP6' equal to that of the combination of the display surface SPA6 of the building SC and the display surface SPP6 of the peripheral portion in the original image of the map (FIG. 15).

In this example, the surface SPP6b' in the new image is equal to the surface SPP6b in the original image, thanks to an enlargement ratio of 25% in the direction of the sequence of the three levels (the enlargement ratio is kept as 100% in the perpendicular direction, for this example). The three levels F1, F2, F3 are displayed with an enlargement ratio of 100% in the position which was occupied by the portion SPP6a in the original image.

Of course, a building of a different shape can be represented in the same way, considering the closest rectangular form, and the number of levels may not be three. It may be something other than a residential or industrial building (Examples: Superimposing of "layers" such as roads/tunnels, geological layers, archeological layers, etc.) and for domains other than telecommunications.

The values of the enlargement ratio in the peripheral zone vary continuously. They may vary according to different methods.

FIG. 19 shows an example of an enlargement method which may be used for the implementation of the method according to the invention. Each point m of an image is identified by two polar coordinates: an angle á in relation to a reference axis OX, and a distance x in relation to a reference point O. The enlargement for all points located at the distance x from the reference point O is noted T(x).

In practice, an image element is not a point but rather a small surface with an elementary angular width dá. After applying the enlargement T(x), the point m is represented by a point M which is located at the distance x.T(x), and which still has the angular position á, and which still has the same elementary angular width dá seen from the reference point O. The surface occupied by this point is multiplied by $T(x)^2$.

To avoid hiding, the method employed involves determining all of the values of the enlargement ratio, to be applied respectively to the elements of the portion to be enlarged, such that the combination of the display surface of the peripheral portion and the display surface of the portion to be enlarged occupies in the new image a surface equal to that of the combination of the display surface of the portion to be enlarged and the display surface of the peripheral portion in the original image of the map. In this example, the surfaces are calculated by integrating elementary surfaces along a radius starting from the reference point O.

FIG. 20 shows the graph of a first example $T1(x)$ of the enlargement function for the implementation of the method according to the invention. The abscissa represents the distance x of an image point in relation to the reference point O, and the ordinate represents the enlargement $T1(x)$.

In this very simple example, the enlargement $T1(x)$ has a constant value P (greater than 100%) for the portion to be enlarged (distance x=0 to Ip) and a constant value C (lower than 100%) for the peripheral portion (distance x=Ip to Ic), the value C being chosen at least equal to the pre-determined minimum value Tmin so that all the important details remain visible.

Before using the zoom, the enlargement was 100% for all the points and in particular between the abscissas 0 and Ic.

The surface of the map is retained if the increase of the surface occupied to represent the abscissa points lower than Ip is equal to the reduction in the surface occupied to represent the abscissa points between Ip and Ic.

For each radius with the angular position á (from 0 to 360 degrees) we therefore have:

$$\int_0^{Ip} (P-100) \cdot dx = \int_{Ip}^{Ic} (100-C) \cdot dx$$

Hence, the constants P and C must be chosen such that:

$(P-100) \cdot Ip = (100-C) \cdot (Ic-Ip)$

FIG. 21 shows the graph of a second example of the enlargement function $T2(x)$ for the implementation of the method according to the invention. In this example, the enlargement $T2(x)$ has a constant value P (greater than 100%) for the portion to be enlarged (distance x=0 to Ip) and a value varying linearly from C (lower than 100%) to 100% for the peripheral portion (distance x=Ip to Ic), the value C being chosen at least equal to the pre-determined minimum value Tmin so that all the important details remain visible.

$$T2(x) = \frac{100-C}{Ic-Ip}(x-Ip) + C$$

Before using the zoom, the enlargement was 100% for all the points and in particular between the abscissas 0 and Ic.

The surface of the map is retained if the increase of the surface occupied to represent the abscissa points lower than Ip is equal to the reduction in the surface occupied to represent the abscissa points between Ip and Ic.

For each radius with the angular position á (from 0 to 360 degrees) we therefore have:

$$\int_0^{Ip} (P-100) \cdot dx = \int_{Ip}^{Ic} \left[ 100 - \left( \left( \frac{100-C}{Ic-Ip}(x-Ip) \right) - C \right) \right] \cdot dx$$

Hence, the constants P and C must be chosen such that:

$$P \cdot Ip - 100Ip = \frac{1}{2} \cdot (100-C) \cdot (Ic-Ip)$$

FIG. 22 shows the graph of a third example $T3(x)$ of the enlargement function for the implementation of the method according to the invention. In this example, the enlargement $T2(x)$ is a function of any form (but its value remains greater than 100%) for the portion to be enlarged (distance x=0 to Ip) and is another function of any form (but its value remains lower than 100%) for the peripheral portion (distance x=Ip to Ic), the minimum value being chosen at least equal to the pre-determined minimum value Tmin so that all the important details remain visible.

Before using the zoom, the enlargement was 100% for all the points and in particular between the abscissas 0 and Ic.

The surface of the map is retained if the increase of the surface occupied to represent the abscissa points lower than Ip is equal to the reduction in the surface occupied to represent the abscissa points between Ip and Ic.

For each radius with the angular position á (from 0 to 360 degrees) we therefore need:

$$\int_0^{Ip} (T3(x)-100) \cdot dx = \int_{Ip}^{Ic} (100-T3(x)) \cdot dx$$

The function $T3(x)$ is therefore chosen for each radius with an angular position á, such that this condition is met. It is perfectly possible to choose a slightly different $T3(x)$ function for each value of á, so long as this condition is met for each value of á.

The invention claimed is:

1. Method of displaying an enhanced image of a building based on an original image of a map including the building, without hiding portions of the map, comprising:
displaying an overhead image of a first elevation of the building in the enhanced image, using an enlargement ratio of 100%, the overhead image of the first elevation being displayed in a location of the enhanced image that matches a location of the building in the original image;
displaying overhead images of other elevations of the building in the enhanced image, using an enlargement ratio of 100%, the overhead images of the other elevations being displayed directly adjacent to the first elevation in a two-dimensional display;

displaying peripheral portions of the original image, in the enhanced image, the peripheral portion being displayed directly adjacent to the two-dimensional display;

applying enlargement ratios to the peripheral portions that are greater than or equal to a pre-determined minimum value;

applying enlargement ratios to some portions of the peripheral portions that are lower than 100%, to ensure that the entire original image and the two-dimensional display is displayed in the enhanced image without occlusion;

Determining at least one important object within the original image;

determining whether the at least one important object is within the peripheral portions of the original image; and setting the pre-determined minimum value to ensure that each of the important objects within the peripheral portions of the original image are legible.

2. Method according to claim 1, wherein the displaying of the peripheral portions includes using enlargement ratios varying continuously from a ratio of 100%, applied to portions of the peripheral portions which are furthest from the two-dimensional display, until a ratio applied to the two-dimensional display, which is at the boundary with the peripheral portions, has an enlargement ratio lower than 100%, such that the combination of the peripheral portions and of the two-dimensional display occupies, in the enhanced image, a surface equal to that of the original image.

3. Programmable device comprising storage means on which a program is saved, this program comprising instructions which, when executed, carry out the stages of the method according to claim 1.

4. Storage means on which a program is saved comprising instructions which, when executed on a programmable device, carry out the stages of the method according to claim 1.

5. Method according to claim 1, wherein the pre-determined minimum value is a value that ensures that details of the peripheral portions of the enhanced image are visible.

* * * * *